United States Patent [19]

Rourke et al.

[11] 4,388,274

[45] Jun. 14, 1983

[54] OZONE COLLECTION AND FILTRATION SYSTEM

[75] Inventors: John L. Rourke, Fairport; Jack C. Azar, Rochester; William K. Murphy, Fairport, all of N.Y.

[73] Assignee: Xerox Corporation, Stamford, Conn.

[21] Appl. No.: 332,024

[22] Filed: Dec. 18, 1981

Related U.S. Application Data

[62] Division of Ser. No. 155,349, Jun. 2, 1980, abandoned.

[51] Int. Cl.[3] .............................................. B01D 53/56

[52] U.S. Cl. ...................................... 422/177; 55/524; 250/325; 355/18; 422/122; 423/210

[58] Field of Search ................... 422/4, 121, 122, 176, 422/177, 178; 55/124, 129, 134, 150, 385 R, 55/524; 250/324–326; 423/210 S; 355/8, 18

[56] References Cited

U.S. PATENT DOCUMENTS

| | | | |
|---|---|---|---|
| 3,643,128 | 2/1972 | Testone | 250/326 X |
| 3,646,910 | 3/1972 | Cade et al. | 250/326 X |
| 3,675,096 | 7/1972 | Kiess | 250/325 X |
| 3,715,640 | 2/1973 | Sato | 250/326 X |
| 3,862,420 | 1/1975 | Banks et al. | 423/210 S X |
| 3,874,789 | 4/1975 | Weber | 250/326 X |
| 3,983,393 | 9/1976 | Thettu et al. | 250/326 |
| 4,040,731 | 8/1977 | Nishikawa | 55/385 R X |
| 4,112,298 | 9/1978 | Weikel, Jr. | 250/326 X |
| 4,143,118 | 3/1979 | Laing | 422/178 X |

OTHER PUBLICATIONS

Leslie, G. G.; "Ozone Filters for Electrophotographic Copying Apparatus"; IBM Technical Disclosure Bulletin, vol. 11, No. 8, Jan. 1969, pp. 944, 945.

*Primary Examiner*—Richard L. Chiesa

[57] ABSTRACT

A novel apparatus for the collection and removal of ozone generated during the operation of machines, such as an electrostatographic copying machine, is disclosed which includes the substantially complete collection of ozone generated by the use of an apertured plenum at the point of ozone generation, and the substantially complete removal of the ozone collected by the use of a fixed bed filtering device which has a large bed area to volume ratio. The disclosed apparatus permits the substantially complete collection of all ozone generated in a relatively small volume of air accomplished with a low pressure drop, so that the ozone collection and removal system would not interfere with the normal operation of the electrostatographic copying machine.

14 Claims, 3 Drawing Figures

OZONE COLLECTION AND FILTRATION SYSTEM

This is a division, of application Ser. No. 155,349, filed June 2, 1980, and now abandoned.

OZONE COLLECTION AND FILTRATION SYSTEM

This invention relates to a high efficiency, low impedance collection and filtration system for ozone and other noxious gases. More particularly, this invention relates to a high efficiency collection and filtration system, for ozone and other noxious gases, which can be conveniently and economically made into a part of a machine which generates such gases during its operation.

BACKGROUND OF THE INVENTION AND PRIOR ART STATEMENT

It is known that in the operation of some machines, ozone and other noxious gases are generated. For example, noxious gases, including ozone, are generated in electrostatographic copying machines as a result of corona discharge. Corona discharge devices are employed in electrostatographic copying machines for the charging or sensitization of the photosensitive member as well as at certain other stations within the copying machines. It is also known that the problem of the formation of ozone and other noxious gases during the operation of corona discharge devices is more acute at higher levels of output of corona charging. As indicated in U.S. Pat. No. 3,983,393, increased copy speeds, as well as other requirements placed on modern copying and duplicating machines, have resulted in needs for higher outputs from the corona devices.

The detrimental effects of such noxious gases on machine components and people are well known. Relatively low concentrations of ozone in the atmosphere, for example, from 1 part per 1,000,000 to 10 part per 1,000,000, can cause headaches and nausea and irritation of mucous membranes. Ozone and other noxious gases generated in the operation of corona charging devices may also detrimentally affect the performance of the photosensitive member in copying machines. Thus, there is a need for an economical and high efficiency method and apparatus for the removal of ozone and other noxious gases.

In IBM Technical Disclosure Bulletin, Vol. 11, No. 8, January 1969, page 944, there is disclosed an ozone filter for electrophotographic copying apparatus which consists of a rectangular and generally plate-like filter whose active ingredient is charcoal impregnated with sodium iodide. Only air from a brush cleaner is collected for filtration and the air near the corona charging units are not collected and filtered. Thus, the IBM device is not particularly directed to those parts of the copying machine which are the points of generation of the ozone.

In U.S. Pat. No. 3,675,096, there is disclosed a corona discharge device in which an elongated knife-edged electrode is enclosed in a housing. The corona generated at the electrode passes out of the housing and onto the surface of a photoconductive layer through a foraminous screen. The interior walls of the housing as well as the screen are coated with a catalytic material, such as silver, to convert ozone formed by the corona discharge to oxygen.

In U.S. Pat. No. 3,862,420, there is disclosed an apparatus for supplying filtered air to a corona discharge device, used to charge a photoconductor in an electrophotographic apparatus, to eliminate contamination within the corona unit. This is done by filtering the air supplied to the corona discharge device first through a particle filter and then through an ammonia filter. The outlet air from the corona discharge device is then passed through an ozone filter. No specific information is provided on the ozone filter, and no filtering system is provided for the transfer and preclean corona devices.

In U.S. Pat. No. 4,040,731, there is disclosed an electrophotographic apparatus having a screen-type photoconductive drum. Since the photoconductive element in such an apparatus is degraded by contact with ozone, this patent proposes to supply air to the screened drum to remove detrimental gases such as ozone and dust produced in a corona charge device. However, there is no provision in this patent for collecting and filtering the air from the corona charge devices.

Finally, in U.S. Pat. No. 4,143,118, there is disclosed an apparatus and method for ozone reduction in electrostatographic reproduction equipment. In the apparatus and method of that patent, ozone rich gases are directed through a fluidized bed reactor in which a bed of catalytically active granular material is fluidized by the ozone laden vapors. The reactor is provided with means for purging fine particles from the perforated wall of the catalyst-containing chamber proximate to the exhaust end of the reactor to prevent such fine particles from becoming permanently entrained. This patent, then, demonstrates one method and apparatus for the removal of ozone rich gases from the area of the corona discharge electrodes, which another prior art patent has termed "not always easy to construct and arrange". See U.S. Pat. No. 4,040,731 at column 2, lines 23–28.

While several devices and approaches have been shown in the prior art for the collection and/or removal of ozone generated at corona discharge devices, there is a continuing need for improved method and apparatus for the collection and removal of ozone and other noxious gases. This is particularly true for new high volume and high speed copying and duplicating machines.

Accordingly, it is an object of the invention to provide an improved method and apparatus for the collection and removal of ozone and other noxious gases generated in machines.

It is another object of the present invention to provide an improved method and apparatus for the removal of ozone and other noxious gases generated by corona discharge devices in electrostatographic copying machines.

It is a further object of the invention to provide an improved method and apparatus which will efficiently and economically collect and remove ozone and other noxious gases generated by corona discharge devices, so that OSHA and other government regulations can be met for the life of the copying machine.

SUMMARY OF THE INVENTION

The above objects are accomplished in accordance with the present invention in an apparatus for the efficient collection and removal of ozone and other noxious gases generated by corona discharge devices in an electrostatographic copying machine in which an air collecting device for collecting the ozone and other noxious gases at the point of their generation is provided to insure the uniform and substantially complete collection of those noxious materials while limiting the pressure drop and the volume of air collected to relatively low levels, and in which the filtering device for removing such collected noxious materials is a fixed bed filtering device with a large bed surface area to volume ratio to insure continuous long term operation at high efficiency. Surprisingly, it has been found that such an apparatus for the removal of ozone and other noxious gases can be made economically and which will reliably remove about 99% or more of the ozone generated and which will have an effective operating life substantially equal to that of the copying machine itself.

More specifically, the air collecting device of the present invention is made an integral part of the corona discharge devices in an electrostatographic copying machine, generally in the form of an apertured plenum mounted in the housing of the corona discharge devices away from the path of the corona emission and having a surface adjacent the corona emission electrode for biasing the corona emission. The apertured plenum has a plurality of relatively small apertures substantially uniformly spaced and positioned along the length of the apertured plenum. In this fashion, substantially uniform and complete removal of ozone and other noxious gases generated by the corona emission electrode along the entire length of the electrode may be made with relatively low pressure drops and with relatively small volume of air collected.

Further, in accordance with the present invention, the filtering device for filtering the collected air to remove the ozone and other noxious gases is made with a fixed bed filter having a large bed area to volume ratio to insure high and sustained efficiency in removing ozone from the collected air.

DETAILED DESCRIPTION OF THE INVENTION

Figure 1:
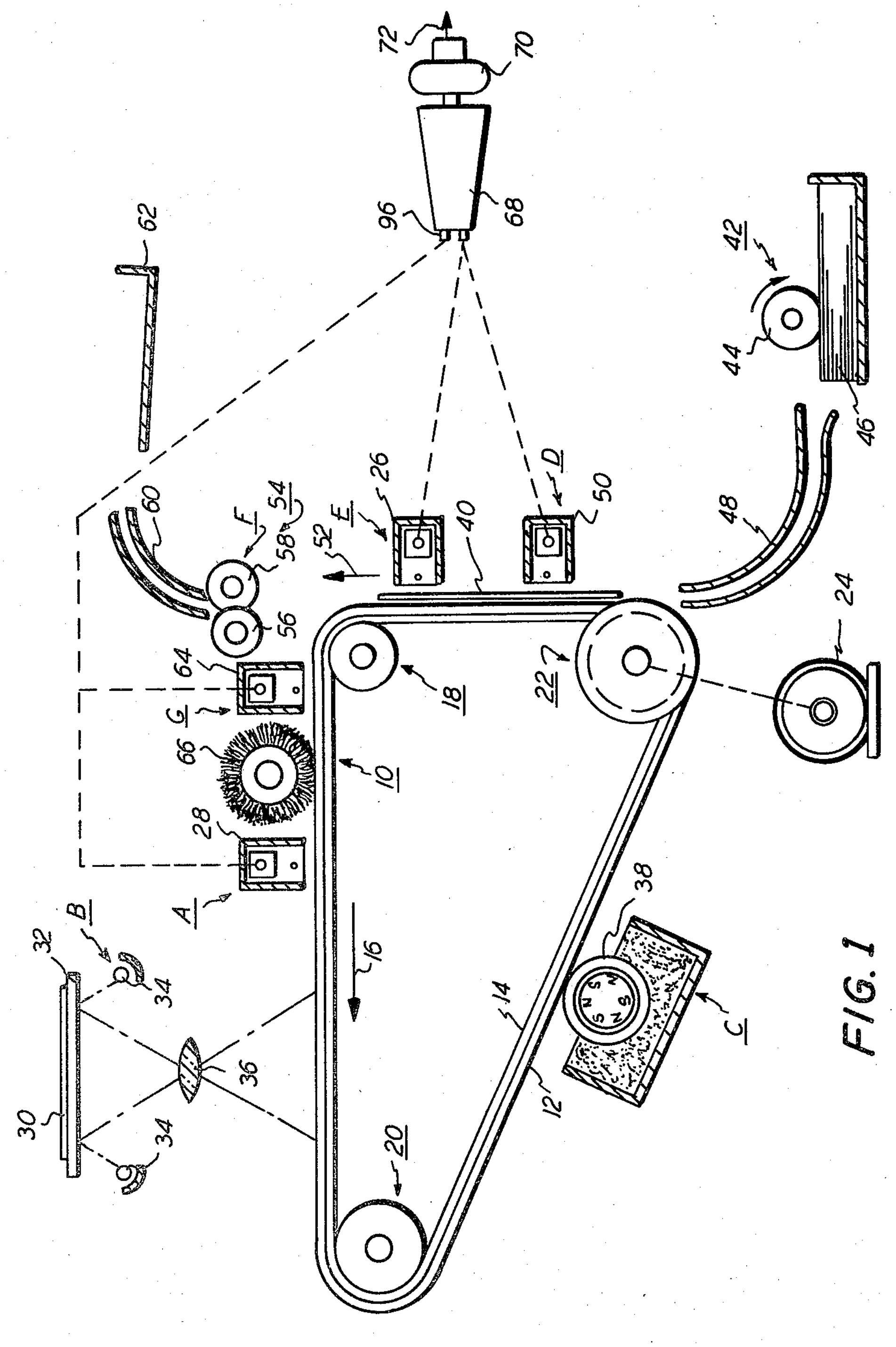
FIG. 1 is a schematic view depicting an electrostatographic copying machine incorporating the elements of the present invention therein.

FIG. 1 schematically depicts the various components of an illustrative electrostatographic copying machine incorporating the apparatus for the collection and removal of ozone and other noxious gases of the present invention therein. However, it will become evident from the following discussion that the apparatus for the collection and removal of ozone and other noxious gases is equally suited for use in a wide variety of devices and is not necessarily limited in its application to the particular embodiment shown herein.

As shown in FIG. 1, the electrostatographic copying machine employs a belt 10 having a photoconductive surface 12 deposited on a conductive substrate 14. Preferably, photoconductive surface 12 is made from a selenium alloy with conductive substrate 14 being made from an aluminum alloy. Belt 10 moves in the direction of arrow 16 to advance successive portions of photoconductive surface 12 sequentially through the various processing stations disposed about a path of movement thereof. Belt 10 is entrained about stripping roller 18, tension roller 20 and drive roller 22 which is itself driven by motor 24.

The various processing stations employed in FIG. 1 copying machine will be now briefly described. Initially, a portion of the belt 10 passes through a charging station A. At charging station A, a corona generating or discharging device, indicated generally by the reference 28, charges photoconductive surface 12 of belt 10 to a relatively high, substantially uniform potential. The corona discharging device 28 will be described in detail in connection with FIG. 2 below.

Next, the charged portion of photoconductive surface 12 is advanced through exposure station B. At exposure station B, an original document 30 is positioned face down upon transparent platen 32. Lamps 34 flash light rays onto original document 30. The light rays reflected from original document 30 are transmitted through lens 36 forming a light image thereon. The light image is projected onto the charged portion of photoconductive surface 12 to selectively dissipate the charge thereon. This records an electrostatic latent image on photoconductive surface 12 which corresponds to the informational areas contained within original document 30.

Thereafter, belt 10 advances the electrostatic latent image recorded on photoconductive surface 12 to development station C. At development station C, a magnetic brush developer roller 38 advances a developer mix into contact with the electrostatic latent image. The latent image attracts the toner particles from the carrier granules forming a toner powder image on photoconductive surface 12 of belt 10.

Belt 10 then advances the toner powder image to transfer station D. At transfer station D, a sheet of support material 40 is moved into contact with the toner powder image. The sheet of support material is advanced to transfer station D by a sheet feeding apparatus 42. Preferably, sheet feeding apparatus 42 includes a feed roller 44 contacting the upper sheet of stack 46. Feed roller 44 rotates so as to advance the upper most sheet from stack 46 into chute 48. Chute 48 directs the advancing sheet or support material into contact with the photoconductive surface 12 of belt 10 in a timed sequence so that the toner powder image developed thereon contacts the advancing sheet of support material at transfer station D.

Transfer station D includes a corona discharging device 50 which sprays ions onto the back side of sheet 40. This attracts the toner powder image from photoconductive surface 12 to sheet 40. After transfer, the sheet 40 advances to detack station E. At detack station E, a corona discharging device 26 charges the back side of the sheet 40 so as to facilitate the separation of the sheet 40 and the toner powder image thereon from the photoconductive surface 12. After the detack station E, the sheet continues to move in the direction of arrow 52 onto a conveyor (not shown) which advances the sheet to fusing station F.

Fusing station F includes a fuser assembly, indicated generally by 54, which permanently affixes the transferred toner powder image to sheet 40. Preferably, fuser assembly 54 includes a heated fuser roller 56 and a backup roller 58. Sheet 40 passes between fuser roller 56 and backup roller 58 with the toner powder image contacting fuser roller 56. In this manner, the toner powder image is permanently affixed to sheet 40. After fusing, chute 60 guides the advancing sheet 40 to catch tray 62 for removal from the copying machine by the operator.

Invariably after the sheet of support material is separated from photoconductive surface 12 of belt 10, some residual particles remain adherent thereto. These residual particles are removed from photoconductive surface 12 at cleaning station G. Cleaning station G includes a preclean corona discharging device 64 and a rotatably mounted fibrous brush 66 in contact with photoconductive surface 12. The preclean corona discharging device 64 neutralizes any remaining electrostatic charge carried by the residual particles and they are then removed or cleaned from photoconductive surface 12 by the rotation of brush 66 in contact therewith. Subsequent to cleaning, a discharge lamp (not shown) floods photoconductive surface 12 with light to dissipate any residual electrostatic charge remaining thereon prior to the charging thereof for the next successive imaging cycle.

As can be gathered from the above description, there are four separate stations where corona discharging devices are employed in this illustrative electrostatographic copying machine, and where there is a need for the collection and removal of ozone and other noxious gases generated by such corona discharge devices. In accordance with the present invention, the ozone and other noxious gases are collected at these corona discharge devices, to be described in more detail below in connection with FIG. 2 and the collected air is passed on through conduits (shown as dotted lines in FIG. 1) to a filtering device 68 and an air circulation means 70, and finally discharged into the atmosphere at the point 72.

As indicated above in connection with the discussion on U.S. Pat. No. 4,040,731, it is known in the prior art to remove ozone laden air from a corona charge device by the means of a fan, but as indicated in that patent, it is not easy to construct and arrange the device so that ozone can effectively be removed from a space extending along the entire length of the corona discharge electrode. This is due to the need to remove ozone laden air substantially evenly along the entire length of the corona discharge electrode and yet not to remove a very large volume of air or to use a large pressure differential. In the case of the device illustrated in FIG. 2 of said U.S. Pat. No. 4,040,731, a substantial volume of air must be removed with a relatively large pressure drop to insure that ozone generated near the ends of the corona discharge wires are effectively collected. In accordance with the present invention, an effective air collection device is provided which is made an integral part of a corona discharge device.

Figure 2:
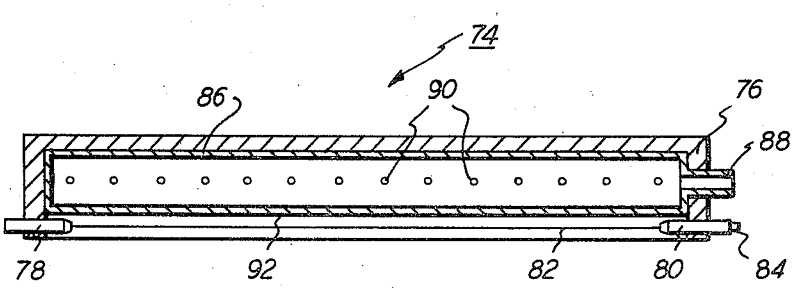
FIG. 2 is a cross-sectional view of a corona discharge device in accordance with the present invention for collecting air containing ozone and other noxious gases.

Referring to FIG. 2, a corona discharge device in accordance with the present invention is schematically illustrated at 74. It is to be understood that the principle of the construction of corona discharge device 74 is used in each of the corona discharge devices 26, 28, 50 and 64, shown in FIG. 1. The corona discharge device 74 is made of a housing 76, end blocks 78 and 80 for holding a corona emission electrode 82 thereinbetween. End block 80 is provided with a terminal 84 for connection to a source of electrical potential (not shown) for the activation of the corona emission electrode 82. An apertured plenum 86 is attached in the housing 76 and has air outlet means 88 connected to one end thereof. The apertured plenum 86 is generally in the form of an elongated tube having a plurality of relatively small apertures 90 substantially uniformly spaced lengthwise on at least one surface of the apertured plenum. Preferably, apertured plenum 86 is in the shape of a rectangular tube having apertures on at least two opposing sides, and having one substantially flat surface 92 adjacent to the corona emission electrode 82. Surface 92 may be connected to a source of electrical potential (not shown) so that when the corona emission electrode 82 is activated, surface 92 may act as a biased electrode to assist in the flow of corona emission towards the surface to be charged. The apertured plenum 86 may be made of any suitable metal or alloy, such as aluminum. Although the size and number of apertures may be varied to suit a particular corona discharge device and to obtain a desired level of pressure drop and volume of air collected, we preferred aperture 90 to be holes about 1/16 inch in diameter and spaced about one inch apart. We preferred to collect a volume of air for each corona discharge device 74 in the order of about 1 to 5 cubic feet per minute (CFM). More preferably, the volume of air collected per corona discharge device should be about 2 to 3 CFM to prevent ozone leakage.

It will be appreciated from the foregoing description that the apertured plenum 86 of the present invention permits the substantially even and uniform collection of ozone laden air throughout the entire length of the corona emission electrode 82 and yet permits the volume of air so collected to be relatively small. Furthermore, the apertured plenum 86 permits the substantially complete removal of ozone (more than 95% collected) and other noxious gases generated when the corona emission electrode 82 is activated. The relatively small volume of air so collected not only simplifies the problem of handling and filtering the air, it also results in relatively low pressure drops being employed. It can be gathered from FIG. 1 that low air flow in the collection of ozone laden air from corona discharge devices 26, 28, 50 and 64 would minimize the disturbance of various processes that take place within the copying machine. For example, a high air flow employed will corona discharge devices 28 and 64 may suck the belt 10 towards the corona discharge devices. Surprisingly, with the corona discharge device of the present invention, substantially all of the ozone and other noxious gases generated by the corona emission electrode 82 can be collected in a relatively small volume of air, for example, 2 to 3 CFM. This results in the requirement of a relatively small air circulation means 70 as well as to minimize disturbances within the copying machine. Typically, the pressure drop in the ozone collection and filtration system of the present invention totals not more than about 2 inches of water and generally not more than 1-1.5 inches of water.

It may be pointed out that besides ozone, other noxious gases, such as nitrogen oxides, are generated by corona emission electrode 82. The corona discharge device 74 of the present invention effectively removes substantially all such other noxious gases for filtration.

Figure 3:
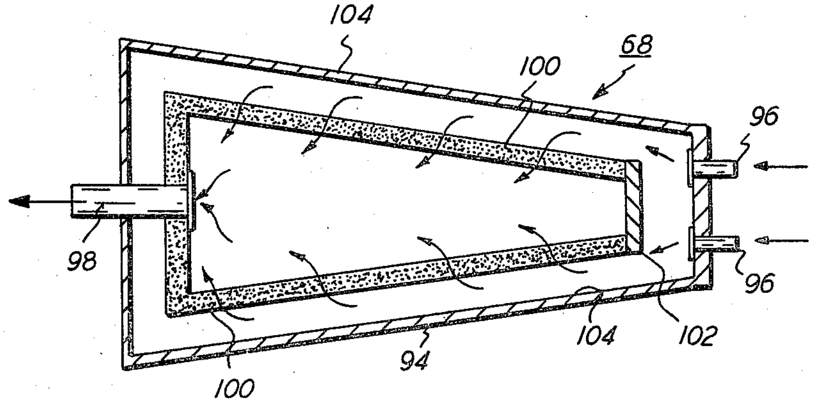
FIG. 3 is a cross-sectional view of a filtering device in accordance with the present invention.

Referring to FIG. 3, there is shown one embodiment of the filtering device for use in the present invention. Filter 68 is shown to be made of a housing 94 generally in the shape of a truncated rectangular pyramid, a plurality of air inlet means 96 at one end and an air outlet means 98 at the opposite end. A relatively thin fixed bed filtering element 100 is located inside housing 94 and has the same general shape as the housing. The fixed bed filtering element 100 may be made of an ozone decomposing material, with foraminous screens on both sides of the fixed bed filtering element to retain the ozone decomposing material in place. Examples of suitable ozone decomposing materials include a mixture of metallic oxides available as "Hopcalite" from the Mine Safety Applicances Corporation, or a composite material comprising a support matrix having coated on its surface an adhering layer of finely divided particles of Hopcalite. Hopcalite is a known catalyst for the decomposition of ozone and other gases, and it is a porous ceramic material made of nominally about 80% manganese oxide ($MnO_2$), and about 20% cupric oxide (CuO).

An example of the composite material for the removal of ozone which may be used in filter 68 is fully disclosed in the copending application of John L. Rourke and Ronald E. Keukelaar, Serial No. 140,915, now U.S. Pat. No. 4,315,837, entitled "Composite Material for Ozone Removal", assigned to the assignee of the present application, and filed on Apr. 16, 1980, the disclosure of which is hereby incorporated by reference. For the purposes of the present invention, the composite material may be described as made of a support matrix, which is preferably made of a material that has a relatively broad transition region, and an adhering layer of fine particles of Hopcalite on the support matrix. A particularly preferred material for the matrix is a polymeric ethylene vinyl acetate. Preferably, the support matrix is substantially spheroidal in shape and about 0.5 to 2.0 mm in size. The fine particles of Hopcalite adhering to the surface of the support matrix are preferably about 150 to 425 microns in size.

When the ozone laden air is collected from the corona discharge devices in the copying machine and passed on to the filter 68 (see FIG. 1), the air is admitted into filter 68 through air inlet means 96. After the air enters the filter 68, it is met by an air distributing element or plate 102 which forces the air to go along the walls 104 of housing 94 before passing through the fixed bed filtering element 100. This has the effect of greatly increasing the bed area of the fixed bed filtering element 100 without greatly increasing the size of the filter 68. It also permits the relative uniform distribution of the air over the entire filter bed surface area. As a result, the filtering of the ozone laden air can be done with relatively low pressure drops to effect a substantially complete removal of the ozone in the air. In this manner, it has been found that filter 68 can be constructed which will have an effective operating life substantially equal to or exceed that of the copying machines. In addition, it has been found that the filtered air from such a filter may have substantially all of the ozone contained in the air decomposed, frequently removing 99% or more of the ozone in the inlet air. Such filtered air may then have an ozone content even lower than that of the ambient air.

Although housing 94 of filter 68 is shown in FIG. 3 as having the shape of a truncated rectangular pyramid, other shapes may be employed to obtain large surface area to volume ratio for the fixed bed filter. For example, housing 94 and fixed bed filtering element 100 may be truncated cones, or they may have star-shaped cross-sectional areas.

The invention will now be described with reference to the following specific examples.

EXAMPLE I

In an electrostatographic copying machine whose internal processing stations are substantially as illustrated in FIG. 1, corona discharging devices constructed generally as shown in FIG. 2 were operated at a nominal voltage of about 6000 volts with a combined total current of about 3.6 milliamperes. The amount of air collected at each of the corona discharging devices was about 3 cubic feet per minute, for a total air flow of about 12 cubic feet per minute (CFM). The amount of ozone collected, determined by analyzing the ozone concentration in the collected air, was about 6500 micrograms per minute. The amount of ozone not collected, measured by analysis of cooling air stream (about 200 CFM) which was exhausted to the atmosphere, amounted to less than about 100 micrograms per minute. The collected air containing the ozone was passed through a truncated pyramid shaped filter as illustrated in FIG. 3. The filter had a fixed bed filtering element made of Hopcalite particles 10 mesh in size with a bed thickness of $\frac{3}{4}$ inch. The volume of Hopcalite in the fixed bed filtering element amounted to about 114 cubic inches, with a filtering surface area of about 201 square inches. The ozone removal efficiency of this filter was substantially 100% when used to filter the collected air. When the thickness of the filtering bed was reduced to $\frac{1}{2}$ inch, the ozone removal efficiency was still better than 99.9%. When the filter bed thickness was reduced to $\frac{3}{8}$ inch, the ozone removal efficiency was about 99.9%. The ozone removal efficiency of the filters decreased with increasing time of usage. Defining the operational life of the filter as the period of time during which the filter has an ozone removal efficiency equal to or greater than 99%, the filter with a bed thickness of $\frac{3}{4}$ inch had an operational life in excess of 600 hours. This period is substantially equal to the average running time of an electrostatographic copying machine, in three years' use. The term ozone removal efficiency, as used herein, is intended to mean the proportion of the ozone in the air fed to a filter that was decomposed or otherwise removed by the filter.

EXAMPLE II

The procedure of Example I was repeated except that the total corona current for the four corona discharging devices was increased from 3.6 milliamperes to 4.2 milliamperes. The amount of ozone contained in the 12 cubic feet per minute of air collected from the four corona discharging devices was found to be about 7400 micrograms per minute, while the amount of ozone exhausted to the atmosphere in the 200 cubic feet per minute of cooling air was less than about 100 micrograms per minute. The ozone removal efficiency of the filters and the effective operating life of the filters were found to be substantially uneffected by the increase in the amount of ozone collected and filtered as compared to those in Example I.

From the above, it can be seen that the present invention provides a method and apparatus for the collection of substantially all of the ozone generated in an electrostatographic copy machine, and for the substantially complete removal of the ozone contained in such collected air. More specifically, in the examples described above, the method and apparatus of the present invention collected 99% or more of the ozone generated, and removed 99% or more of the ozone so collected over the life of the filter. This results in the elimination of 98% or more of the total ozone generated in the machine, and leaves only 2% or less of the ozone generated to be exhausted into the atmosphere, which is mixed with a relatively large air flow. As a result, the average concentration of ozone in the air emitted by the collection and filtration system of the present invention is less than about 0.01 parts per million, which is substantially below the present time weighted average level established by OSHA. Furthermore, the method and apparatus of the present invention can be made compactly and economically to permit incorporation into a typical electrostatographic copying machine. In addition, the method and apparatus of the present invention, once incorporated in an electrostatographic copy machine, can be made to have an effective operating life substantially equal to or exceeding that of the copying machine itself. In this manner, OSHA and other governmental requirements relating to ozone may be fully complied with.

While the invention has been described in detail with reference to specific and preferred embodiments, it will be appreciated that various modifications may be made from the specific details without departing from the spirit and scope of the invention.

What is claimed is:

1. An apparatus for the collection and removal of ozone and other noxious gases generated by corona discharge devices in an electrostatographic copying machine which comprises: at least one corona discharge device comprising a housing, a corona emission electrode mounted in said housing, and an apertured plenum mounted in said housing away from the path of the corona emission, said apertured plenum having a surface adjacent said corona emission electrode for biasing the corona emission; an ozone and other noxious gases filtering device comprising a low pressure drop fixed bed filter having a large bed area to volume ratio; conduit means connecting the apertured plenum in said corona discharge device with an air inlet in said filtering device; and air circulation means communicating with said apertured plenum, said conduit means and said filtering device for collecting air containing ozone and other noxious gases therethrough.

2. An apparatus according to claim 1 wherein said apertured plenum has a predetermined number of apertures of predetermined size distributed substantially uniformly along the lengthwise direction of said corona emission electrode so as to substantially completely collect the ozone and other noxious gases generated while limiting the pressure drop and amount of air collected when the apertured plenum is connected to the air circulation means.

3. An apparatus according to claim 1 wherein said apertured plenum is in the form of a rectangular tube having a surface adjacent said corona emission electrode for biasing the corona emission, said apertured plenum having holes on at least one of the remaining surfaces, said holes being about 1/16 inch in diameter and spaced about 1 inch apart.

4. An apparatus according to claim 3 wherein said rectangular tube has holes on two opposing sides.

5. An apparatus according to claim 4 wherein said filtering device comprises a housing having one or more side walls and two ends, an air inlet at one of said ends and an air outlet at the other end, an air distributing element adjacent said air inlet for distributing incoming air to said side walls, an air collecting element disposed centrally in said filtering device and communicating with said air outlet, said fixed bed filter being positioned between said side walls and said air collecting element.

6. An apparatus according to claim 1 wherein said filtering device comprises a housing having one or more side walls and two ends, an air inlet at one of said ends and an air outlet at the other end, an air distributing element adjacent said air inlet for distributing incoming air to said side walls, an air collecting element disposed centrally in said filtering device and communicating with said air outlet, said fixed bed filter being positioned between said side walls and said air collecting element.

7. A filtering device according to claim 1 wherein said housing is in the form of a truncated cone.

8. A filtering device according to claim 1 wherein said housing is in the form of a truncated pyramid.

9. A filtering device according to claim 1 wherein said fixed bed filter comprises Hopcalite particles.

10. A filtering device according to claim 9 wherein said Hopcalite particles are about 10 mesh in size.

11. A filtering device according to claim 1 wherein said fixed bed filter comprises a composite material comprising a support matrix having coated on its surface an adhering layer of finely divided particles of Hopcalite.

12. A filtering device according to claim 11 wherein said support matrix is ethylene vinyl acetate beads.

13. A filtering device according to claim 1 wherein said fixed bed filter is not more than about 1 inch in thickness.

14. An apparatus according to claim 1 wherein said collection and removal apparatus provides a total pressure drop for collecting and filtering the air of less than about 1.5 inches of water, and wherein the volume of air collected is not more than about 20 CFM.

* * * * *